US009531117B1

(12) United States Patent
Yang (10) Patent No.: US 9,531,117 B1
(45) Date of Patent: Dec. 27, 2016

(54) ELECTRICAL CONNECTOR STRUCTURE

(71) Applicant: ALL BEST PRECISION TECHNOLOGY CO., LTD., Taoyuan (TW)

(72) Inventor: Haven Yang, New Taipei (TW)

(73) Assignee: ALL BEST PRECISION TECHNOLOGY CO., LTD. (TW)

( * ) Notice: Subject to any disclaimer, the term of this patent is extended or adjusted under 35 U.S.C. 154(b) by 0 days.

(21) Appl. No.: 15/095,340

(22) Filed: Apr. 11, 2016

(51) Int. Cl.
*H01R 13/40* (2006.01)
*H01R 13/533* (2006.01)

(52) U.S. Cl.
CPC .................................. *H01R 13/533* (2013.01)

(58) Field of Classification Search
CPC . H01R 13/533; H01R 13/6587; H01R 13/514; H01R 13/518; H05K 7/20509; H05K 7/1424
See application file for complete search history.

(56) References Cited

U.S. PATENT DOCUMENTS

| | | | | |
|---|---|---|---|---|
| 5,982,619 A | * | 11/1999 | Giannatto | H05K 7/1424 165/80.3 |
| 7,674,136 B2 | * | 3/2010 | Steinke | H01R 13/514 439/541.5 |
| 8,469,744 B2 | * | 6/2013 | Nichols | H01R 13/518 439/607.01 |
| 8,613,632 B1 | * | 12/2013 | Nichols | H01R 13/6587 439/485 |
| 2013/0114211 A1 | * | 5/2013 | Regnier | H05K 7/20509 361/704 |
| 2013/0164970 A1 | | 6/2013 | Regnier et al. | |

* cited by examiner

*Primary Examiner* — Jean F Duverne
(74) *Attorney, Agent, or Firm* — Schmeiser, Olsen & Watts, LLP (57) ABSTRACT

An electrical connector structure includes a heat transfer enclosure; a base having an upper and a lower insertion slot and disposed in the enclosure; a horizontal intermediate heat transfer member separating the enclosure into an upper and a lower insertion channel, and having an upper and a lower opening formed thereon; a heat transfer element disposed in the horizontal intermediate heat transfer member, and having an upper and a lower heat transfer surface with a first air passage located therebetween; an upper heat transfer sheet having upper heat transfer spring fingers and disposed in the upper opening and connected to the upper heat transfer surface; and a lower heat transfer sheet having lower heat transfer spring fingers and disposed in the lower opening and connected to the lower heat transfer surface. With these arrangements, the lower insertion channel of the electrical connector structure can have a reduced temperature.

16 Claims, 11 Drawing Sheets

ELECTRICAL CONNECTOR STRUCTURE

FIELD OF THE INVENTION

The present invention relates to an electrical connector structure, and more particularly to an electrical connector structure that includes relatively simple heat transfer structure to reduce the temperature at a lower insertion channel thereof.

BACKGROUND OF THE INVENTION

Electrical connectors are frequently used to enable data transmission among electronic devices. Generally, an electric connector will produce heat during the course of data transmission. The produced heat tends to accumulated in a lower insertion channel of the electrical connector and can not be easily dissipated to thereby cause a rising temperature at the lower insertion channel. US Patent Publication No. 2013/0164970 A1 discloses a connector with integrated heat sink, of which a heat transfer plate has a main wall or at least one side wall (i.e. the heat transfer plate is U-shaped or L-shaped), with spring finger plates mounted on the side wall. Spring fingers on the spring finger plates function to reduce the thermal resistance between the heat transfer plate and the spring finger plate, so that the heat produced by the electrical connector during operation thereof is transferred to the heat transfer plate and then dissipated into ambient air from heat radiation fins outside the heat transfer plate. However, being limited by the use environment of the electrical connector, the transverse heat radiation fins on the main walls of the heat transfer plates of a plurality of parallelly arranged electrical connectors will occupy too many use environment spaces. Further, the assembling of the spring finger plates to the electrical connectors via the heat transfer plates involves complex procedures and structure. Moreover, the mounting of the spring finger plates in both of the upper and the lower insertion channel of the electrical connector will cause difficulty in providing good contact force and low insertion force at the same time.

It is therefore tried by the inventor to develop an electrical connector structure that includes relatively simple heat transfer structure to reduce the temperature of a lower insertion channel thereof.

SUMMARY OF THE INVENTION

In view of the disadvantages of the conventional electrical connector structure, a primary object of the present invention is to provide an electrical connector structure that includes relatively simple heat transfer structure to reduce the temperature of a lower insertion channel thereof.

To achieve the above and other objects, the electrical connector structure according to a first preferred embodiment of the present invention includes a heat transfer enclosure, at least one base, at least one horizontal intermediate heat transfer member, at least one heat transfer element, at least one upper heat transfer sheet, and at least one lower heat transfer sheet. The base has an upper insertion slot and a lower insertion slot, and is disposed in the heat transfer enclosure. The at least one horizontal intermediate heat transfer member has an upper intermediate sheet, a front panel and a lower intermediate sheet; the front panel is located between and connected to front ends of the upper intermediate sheet and the lower intermediate sheet; the upper intermediate sheet is provided with an upper opening, and the lower intermediate sheet is provided with a lower opening; and the horizontal intermediate heat transfer member separates the heat transfer enclosure into an upper insertion channel and a lower insertion channel, which are located corresponding to the upper insertion slot and the lower insertion slot, respectively. The at least one heat transfer element has an upper heat transfer surface, a lower heat transfer surface and at least one first air passage located between the upper and the lower heat transfer surface; and the heat transfer element is disposed in the horizontal intermediate heat transfer member. The at least one upper heat transfer sheet has at least one upper heat transfer spring finger formed thereon, and is disposed in the upper opening and connected to the upper heat transfer surface with the upper heat transfer spring finger protruding into the upper insertion channel. The at least one lower heat transfer sheet has at least one lower heat transfer spring finger formed thereon, and is disposed in the lower opening and connected to the lower heat transfer surface with the lower heat transfer spring finger protruding into the lower insertion channel.

In the electrical connector structure according to the first preferred embodiment of the present invention, when there are at least two bases transversely arranged in the heat transfer enclosure, the electrical connector structure further comprises at least one vertical intermediate heat transfer sheet. The vertical intermediate heat transfer sheet is formed with a plurality of left heat transfer spring fingers and a plurality of right heat transfer spring fingers, and each vertical intermediate heat transfer sheet separates two laterally adjacent upper insertion channels, two laterally adjacent horizontal intermediate heat transfer members and two laterally adjacent lower insertion channels. The left heat transfer spring fingers are protruded into the upper and lower insertion channels, and the right heat transfer spring fingers are protruded into the upper and lower insertion channels.

In the electrical connector structure according to the first preferred embodiment of the present invention, the front panel of the horizontal intermediate heat transfer member has at least one front air vent and the base has at least one second air passage located between the upper and the lower insertion slot; and the front air vent, the first air passage and the second air passage are sequentially communicable with one another.

In the electrical connector structure according to the first preferred embodiment of the present invention, the upper heat transfer surface of the heat transfer element is a flat surface, the lower heat transfer surface of the heat transfer element is a flat surface.

In the electrical connector structure according to the first preferred embodiment of the present invention, the upper heat transfer sheet can be integrally formed with the upper intermediate sheet of the horizontal intermediate heat transfer member, the lower heat transfer sheet can be integrally formed with the lower intermediate sheet of the horizontal intermediate heat transfer member.

In the electrical connector structure according to the first preferred embodiment of the present invention, when the upper heat transfer sheet has a plurality of upper heat transfer spring fingers formed thereon, a part of the upper heat transfer spring fingers are protruded into the upper insertion channel while others are protruded to contact with the upper heat transfer surface of the heat transfer element; when the lower heat transfer sheet has a plurality of lower heat transfer spring fingers formed thereon, a part of the lower heat transfer spring fingers are protruded into the lower insertion channel while others are protruded to contact with the lower heat transfer surface of the heat transfer element.

The electrical connector structure according to the first preferred embodiment of the present invention further includes a plug-type device adapted to be inserted into the upper insertion channel or the lower insertion channel. The plug-type device is in contact with the upper heat transfer spring finger of the upper heat transfer sheet or the lower heat transfer spring finger on the lower heat transfer sheet.

In the case the electrical connector structure according to the first preferred embodiment of the present invention includes a plurality of bases, the electrical connector structure can also further include a plug-type device adapted to be inserted into the upper insertion channel or the lower insertion channel. The plug-type device is in contact with the upper heat transfer spring finger of the upper heat transfer sheet or the lower heat transfer spring finger of the lower heat transfer sheet, and the plug-type device is in contact with the left or the right heat transfer spring fingers of the vertical intermediate heat transfer sheet.

The electrical connector structure according to the first preferred embodiment of the present invention can further include at least one heat dissipation member. In this case, the heat transfer enclosure is formed with at least one top opening. The heat dissipation member is correspondingly disposed in the top opening with a bottom of the heat dissipation member extending into the upper insertion channel.

To achieve the above and other objects, the electrical connector structure according to a second preferred embodiment of the present invention includes a heat transfer enclosure, at least one base, at least one horizontal intermediate heat transfer member, at least one heat transfer element, at least one upper heat transfer block, and at least one lower heat transfer block. The base has an upper insertion slot and a lower insertion slot, and is disposed in the heat transfer enclosure. The at least one horizontal intermediate heat transfer member has an upper intermediate sheet, a front panel and a lower intermediate sheet; the front panel is located between and connected to front ends of the upper intermediate sheet and the lower intermediate sheet; the upper intermediate sheet is provided with an upper opening, and the lower intermediate sheet is provided with a lower opening; and the horizontal intermediate heat transfer member separates the heat transfer enclosure into an upper insertion channel and a lower insertion channel, which are located corresponding to the upper insertion slot and the lower insertion slot, respectively. The at least one heat transfer element has an upper heat transfer surface, a lower heat transfer surface and at least one first air passage located between the upper and the lower heat transfer surface; and the heat transfer element is disposed in the horizontal intermediate heat transfer member. The at least one upper heat transfer block is disposed in the upper opening and connected to the upper heat transfer surface; and the upper heat transfer block is protruded into the upper insertion channel. The at least one lower heat transfer block is disposed in the lower opening and connected to the lower heat transfer surface; and the lower heat transfer block is protruded into the lower insertion channel.

In the electrical connector structure according to the second preferred embodiment of the present invention, when there are at least two bases transversely arranged in the heat transfer enclosure, the electrical connector structure further comprises at least one vertical intermediate heat transfer sheet. The vertical intermediate heat transfer sheet is formed with a plurality of left heat transfer spring fingers and a plurality of right heat transfer spring fingers, and each vertical intermediate heat transfer sheet separates two laterally adjacent upper insertion channels, two laterally adjacent horizontal intermediate heat transfer members and two laterally adjacent lower insertion channels. The left heat transfer spring fingers are protruded into the upper and lower insertion channels, and the right heat transfer spring fingers are protruded into the upper and lower insertion channels.

In the electrical connector structure according to the second preferred embodiment of the present invention, the front panel of the horizontal intermediate heat transfer member has at least one front air vent and the base has at least one second air passage located between the upper and the lower insertion slot; and the front air vent, the first air passage and the second air passage are sequentially communicable with one another.

In the electrical connector structure according to the second preferred embodiment of the present invention, the upper heat transfer surface of the heat transfer element is a flat surface, the lower heat transfer surface of the heat transfer element is a flat surface.

The electrical connector structure according to the second preferred embodiment of the present invention further includes a plug-type device adapted to be inserted into the upper insertion channel or the lower insertion channel. The plug-type device is in contact with the upper heat transfer block or the lower heat transfer block.

In the case the electrical connector structure according to the second preferred embodiment of the present invention includes a plurality of bases, the electrical connector structure can also further include a plug-type device adapted to be inserted into the upper insertion channel or the lower insertion channel. The plug-type device is in contact with the upper heat transfer block or the lower heat transfer block, and the plug-type device is in contact with the left or the right heat transfer spring fingers of the vertical intermediate heat transfer sheet.

The electrical connector structure according to the second preferred embodiment of the present invention can further include at least one heat dissipation member. In this case, the heat transfer enclosure is formed with at least one top opening. The heat dissipation member is correspondingly disposed in the top opening with a bottom of the heat dissipation member extending into the upper insertion channel.

With the above arrangements, the electrical connector structure of the present invention is able to reduce the temperature of the lower insertion channel via a relatively simple heat transfer structure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings. For the purpose of easy to understand, elements that are the same in the preferred embodiments are denoted by the same reference numerals.

Please refer to FIGS. 1 to 5. An electrical connector structure according to a first preferred embodiment of the present invention includes a heat transfer enclosure 1, at least one base 2, at least one horizontal intermediate heat transfer member 3, at least one heat transfer element 4, at least one upper heat transfer sheet 5, and at least one lower heat transfer sheet 6. The heat transfer enclosure 1 can be a rectangular cuboid. The base 2 has an upper insertion slot 21 and a lower insertion slot 22. The base 2 can be disposed in a rear inner portion of the heat transfer enclosure 1 with an electrical connection surface 24 exposed from the heat transfer enclosure 1 for electrically connecting to a circuit board (not shown). The horizontal intermediate heat transfer member 3 has an upper intermediate sheet 31, a front panel 33, and a lower intermediate sheet 32. The front panel 33 is located between and connected to front ends of the upper intermediate sheet 31 and the lower intermediate sheet 32. The upper intermediate sheet 31 is provided with an upper opening 311, and the lower intermediate sheet 32 is provided with a lower opening 321. The horizontal intermediate heat transfer member 3 separates an internal space of the heat transfer enclosure 1 into an upper insertion channel 11 and a lower insertion channel 12, which are located corresponding to the upper insertion slot 21 and the lower insertion slot 22, respectively. The number of horizontal intermediate heat transfer members 3 is the same as that of bases 2. The heat transfer element 4 has an upper heat transfer surface 41, a lower heat transfer surface 42, and at least one first air passage 43. The first air passage 43 is located between the upper and the lower heat transfer surface 41, 42. The heat transfer element 4 is disposed in the horizontal intermediate heat transfer member 3, and the number of heat transfer members 4 is the same as that of bases 2. Further, a light guide receiving space 44 is formed at each of two lateral sides of the heat transfer element 4 for receiving a light guide 25 therein. The upper heat transfer sheet 5 has at least one upper heat transfer spring finger 51 formed thereon. The upper heat transfer sheet 5 is disposed in the upper opening 311 and can be connected to the upper heat transfer surface 41 by riveting, snap fitting, applying thermal paste or soldering. The upper heat transfer spring finger 51 is protruded into the upper insertion channel 11 for contacting with a plug-type device (not shown). The number of upper heat transfer sheets 5 is the same as that of heat transfer members 4. In the case the upper heat transfer spring finger 51 is straight in shape, a free end of the upper heat transfer spring finger 51 should be directed toward the upper insertion slot 21 to avoid hindering the insertion of the plug-type device into the upper insertion slot 21. On the other hand, in the case the upper heat transfer spring finger 51 is horizontally downward curved in shape, the free end of the upper heat transfer spring finger 51 can be directed toward or away from the upper insertion slot 21. The lower heat transfer sheet 6 has at least one lower heat transfer spring finger 61 formed thereon. The lower heat transfer sheet 6 is disposed in the lower opening 321 and can be connected to the lower heat transfer surface 42 by riveting, snap fitting, applying thermal paste or soldering. The lower heat transfer spring finger 51 is protruded into the lower insertion channel 12 for contacting with a plug-type device (not shown). The number of lower heat transfer sheets 6 is the same as that of heat transfer members 4. In the case the lower heat transfer spring finger 61 is straight in shape, a free end of the lower heat transfer spring finger 61 should be directed toward the lower insertion slot 22 to avoid hindering the insertion of the plug-type device into the lower insertion slot 22. On the other hand, in the case the lower heat transfer spring finger 61 is horizontally upward curved in shape, the free end of the lower heat transfer spring finger 61 can be directed toward or away from the lower insertion slot 22.

Figure 6:
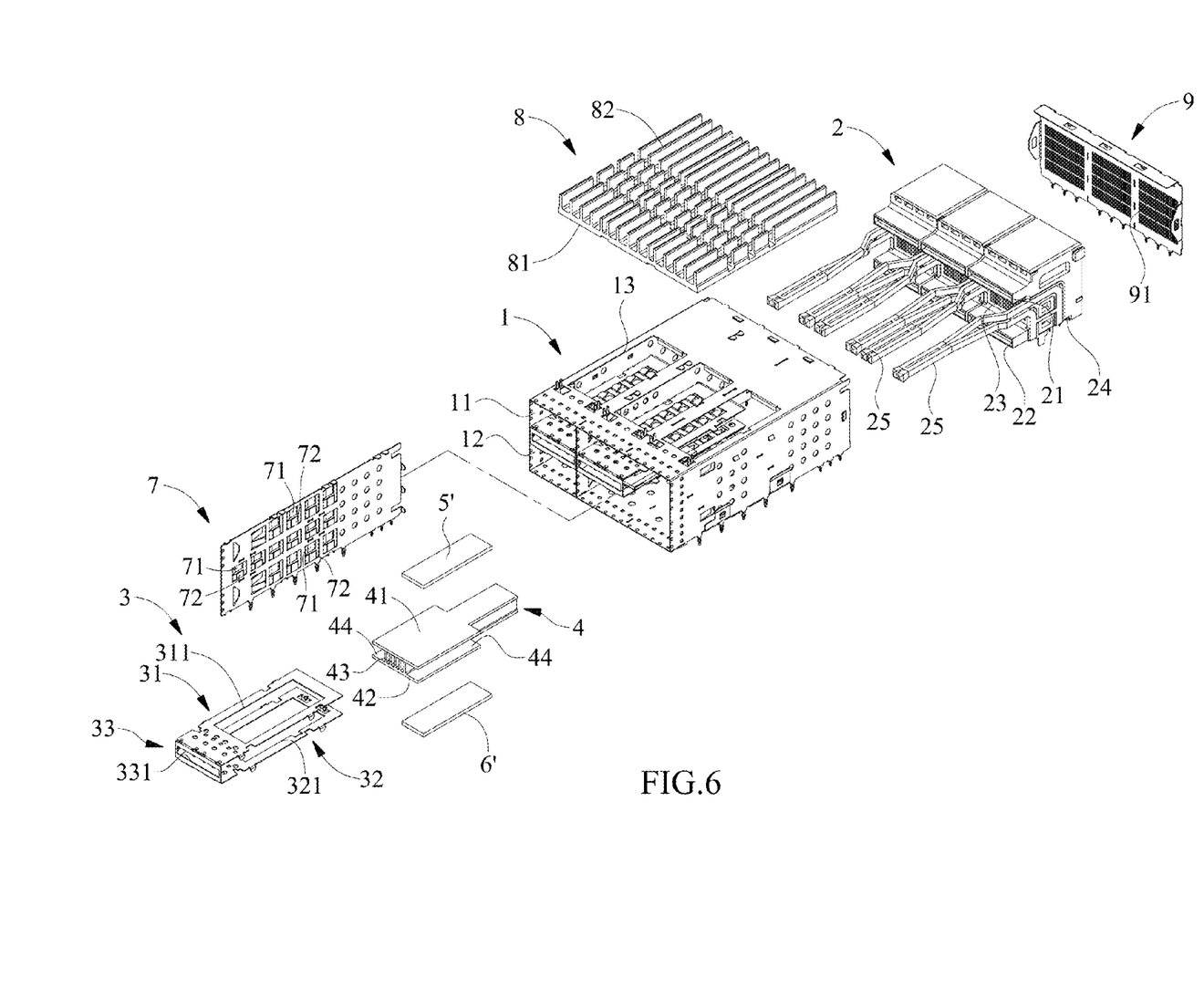
FIG. 6 is a front exploded perspective view of an electrical connector structure according to a second preferred embodiment of the present invention.
Figure 7:
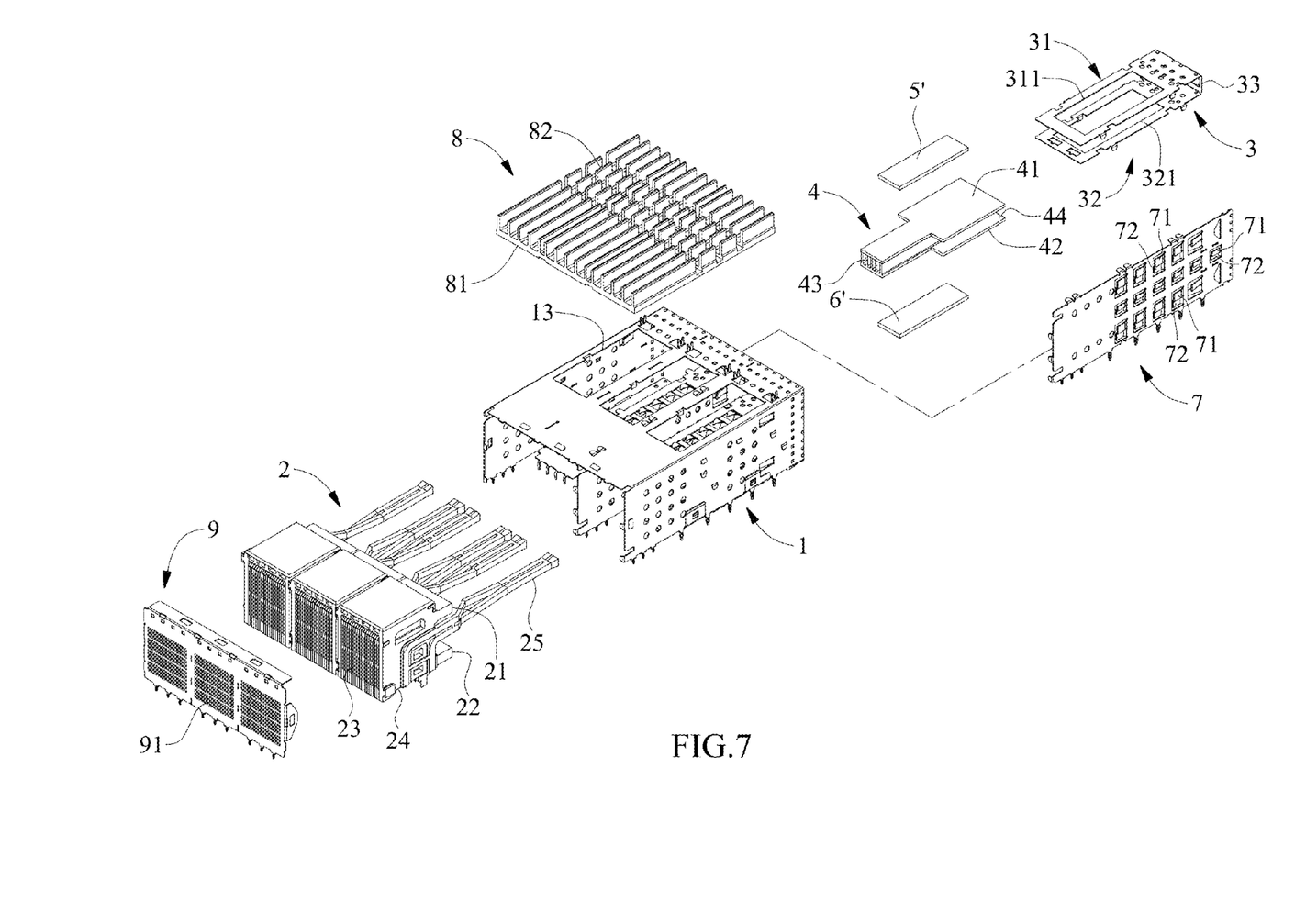
FIG. 7 is a rear exploded perspective view of the electrical connector structure according to the second preferred embodiment of the present invention.
Figure 8:
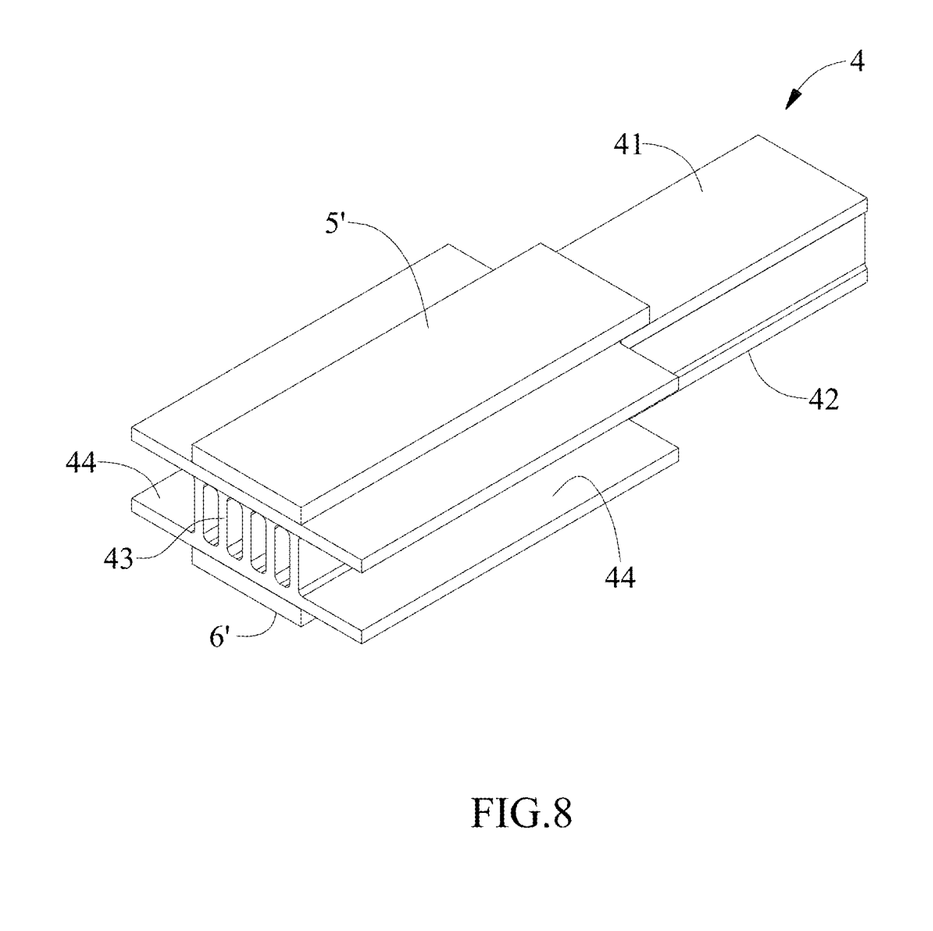
FIG. 8 is a perspective view showing an upper heat transfer block, a lower heat transfer block and a heat transfer element included in the second preferred embodiment of the present invention in an assembled state.

Please refer to FIGS. 6 to 8, in which an electrical connector structure according to a second preferred embodiment of the present invention is shown. In the first preferred embodiment, the upper heat transfer sheet 5 with the upper heat transfer spring finger 51 is disposed in the upper opening 311 of the horizontal intermediate heat transfer member 3 and can be connected to the upper heat transfer surface 41 of the heat transfer element 4 by riveting, snap fitting, applying thermal paste or soldering, and the upper heat transfer spring finger 51 is protruded into the upper insertion channel 11 for contacting with a plug-type device; and the lower heat transfer sheet 6 with the lower heat transfer spring finger 61 is disposed in the lower opening 321 of the horizontal intermediate heat transfer member 3 and can be connected to the lower heat transfer surface 42 of the heat transfer element 4 by riveting, snap fitting, applying thermal paste or soldering, and the lower heat transfer spring finger 61 is protruded into the lower insertion channel 12 for contacting with a plug-type device. However, unlike the first preferred embodiment, the second preferred embodiment omits the upper and lower heat transfer sheets 5, 6 and includes an upper heat transfer block 5', which is disposed in the upper opening 311 of the horizontal intermediate heat transfer member 3 and connected to the upper heat transfer surface 41 of the heat transfer element 4 to protrude into the upper insertion channel 11 for contacting with a plug-type device (not shown), and a lower heat transfer block 6', which is disposed in the lower opening 321 of the horizontal intermediate heat transfer member 3 and connected to the lower heat transfer surface 42 of the heat transfer element 4 to protrude into the lower insertion channel 12 for contacting with a plug-type device (not shown).

With the above arrangements of the electrical connector structure according to the first and the second preferred embodiment of the present invention, the horizontal intermediate heat transfer member 3, the upper heat transfer spring finger 51 of the upper heat transfer sheet 5 or the upper heat transfer block 5', the heat transfer element 4, and the lower heat transfer spring finger 61 of the lower heat transfer sheet 6 or the lower heat transfer block 6' can transfer heat produced by the plug-type device inserted in the electrical connector structure to the heat transfer enclosure 1, from where the heat is radiated into surrounding space. Therefore, heat would not concentrate in specific areas of the electrical connector structure to cause a rising temperature at these areas, particularly at the lower insertion channel 12 having the plug-type device inserted therein. Further, in both of the first and second preferred embodiments, the first air passage 43 in the heat transfer element 4 provides increased heat transfer areas to enable upgraded heat transfer efficiency. Therefore, the electrical connector structure according to the present invention is able to reduce the temperature of the lower insertion channel thereof via a relatively simple heat transfer structure.

Figure 1:
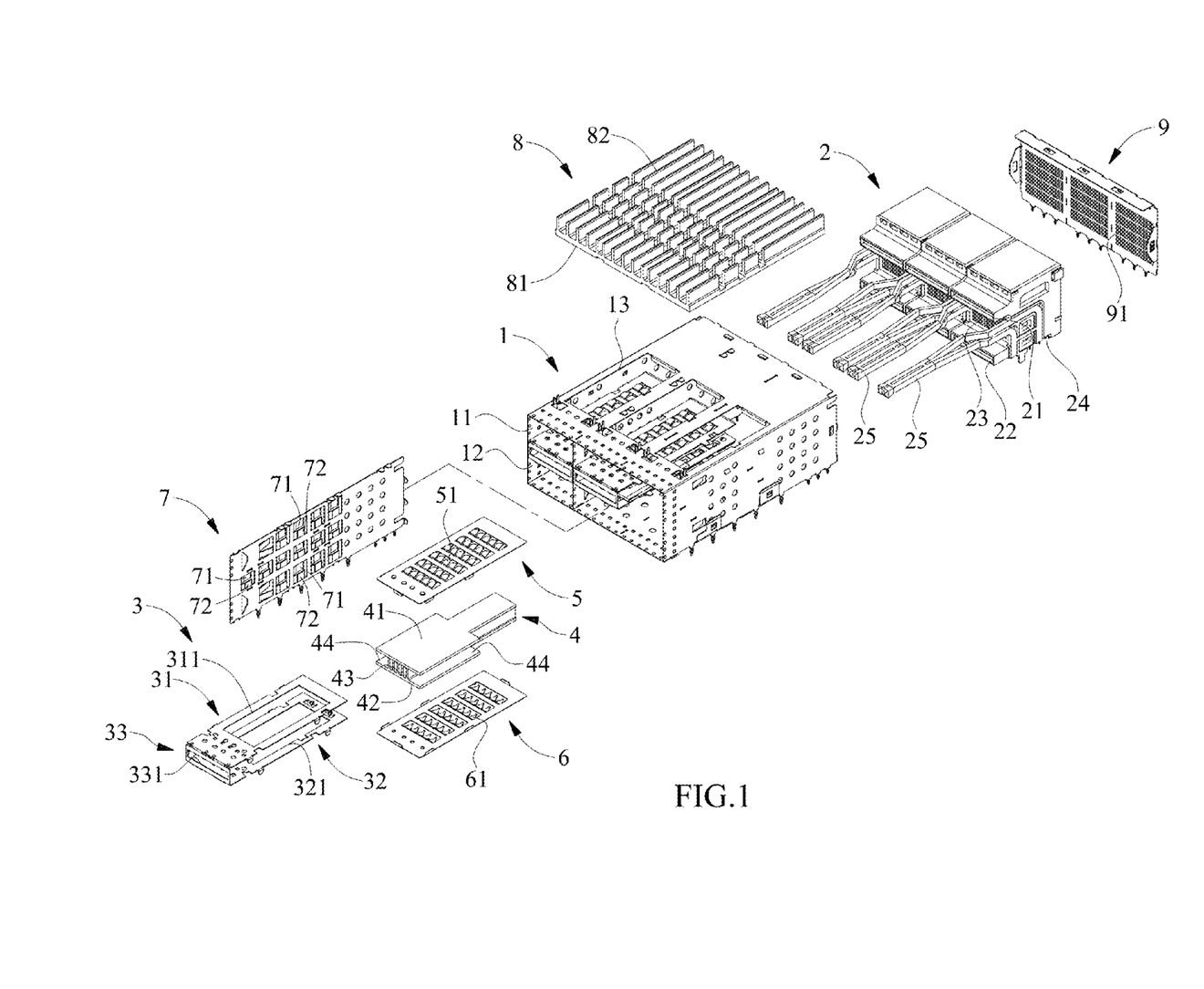
FIG. 1 is a front exploded perspective view of an electrical connector structure according to a first preferred embodiment of the present invention.
Figure 2:
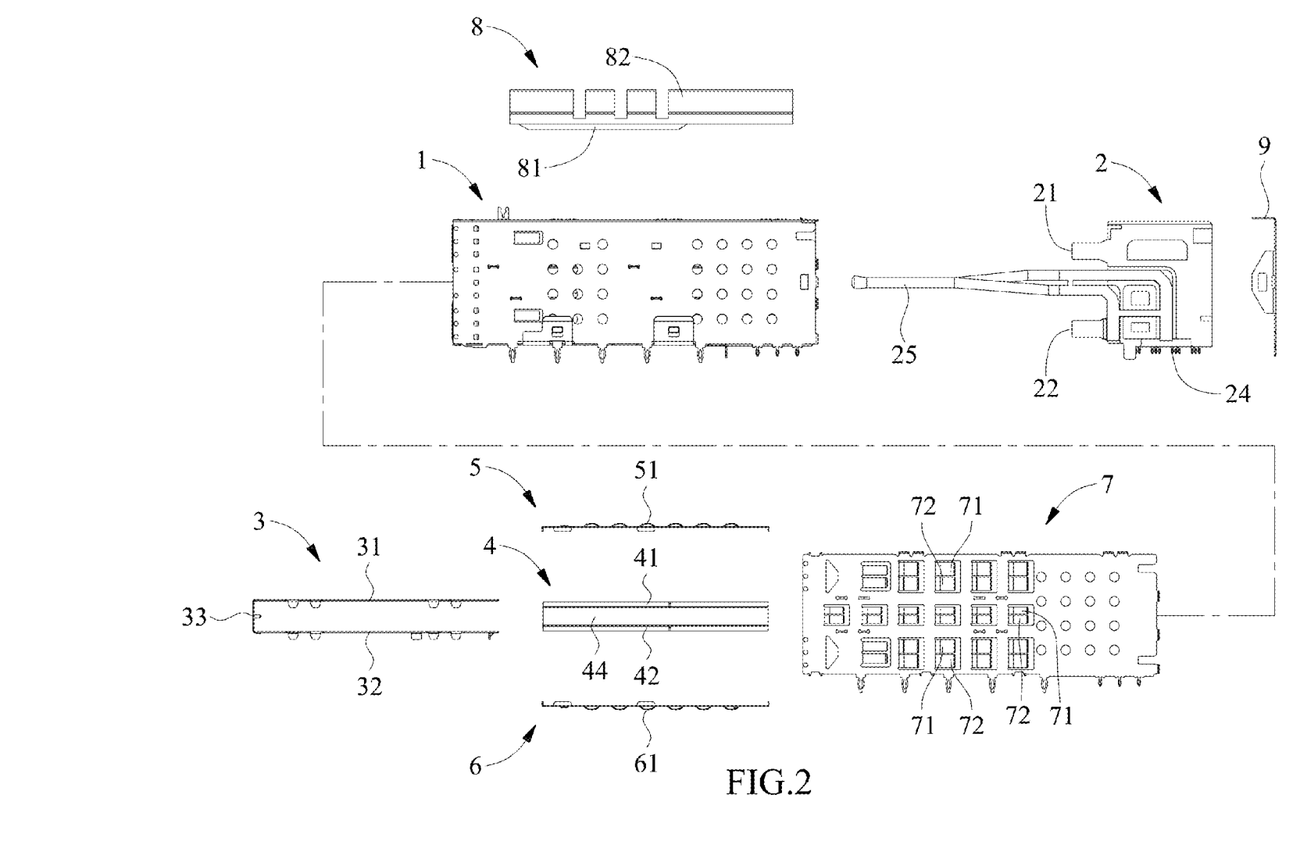
FIG. 2 is an exploded side view of the electrical connector structure according to the first preferred embodiment of the present invention.
Figure 3:
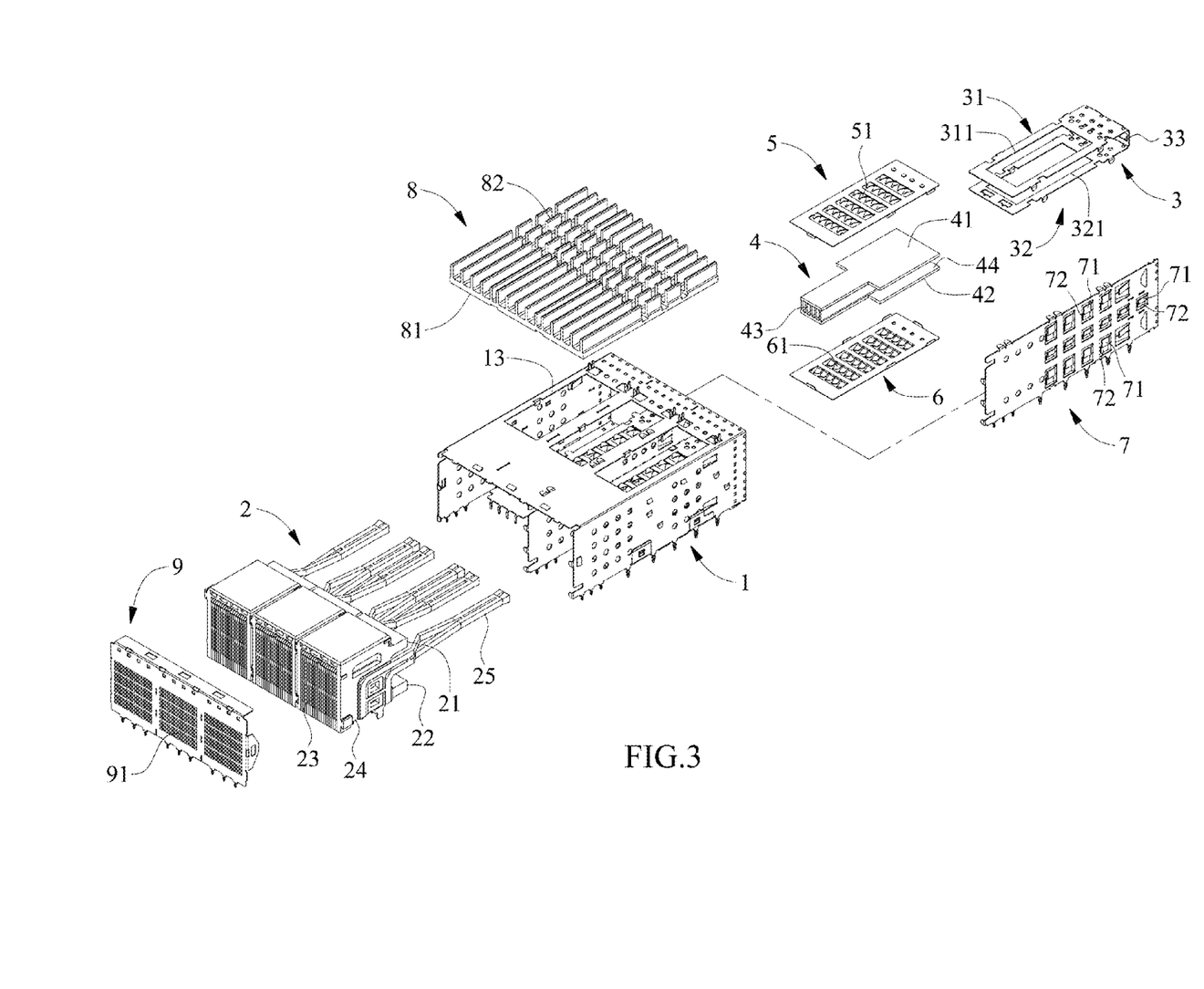
FIG. 3 is a rear exploded perspective view of the electrical connector structure according to the first preferred embodiment of the present invention.
Figure 4:
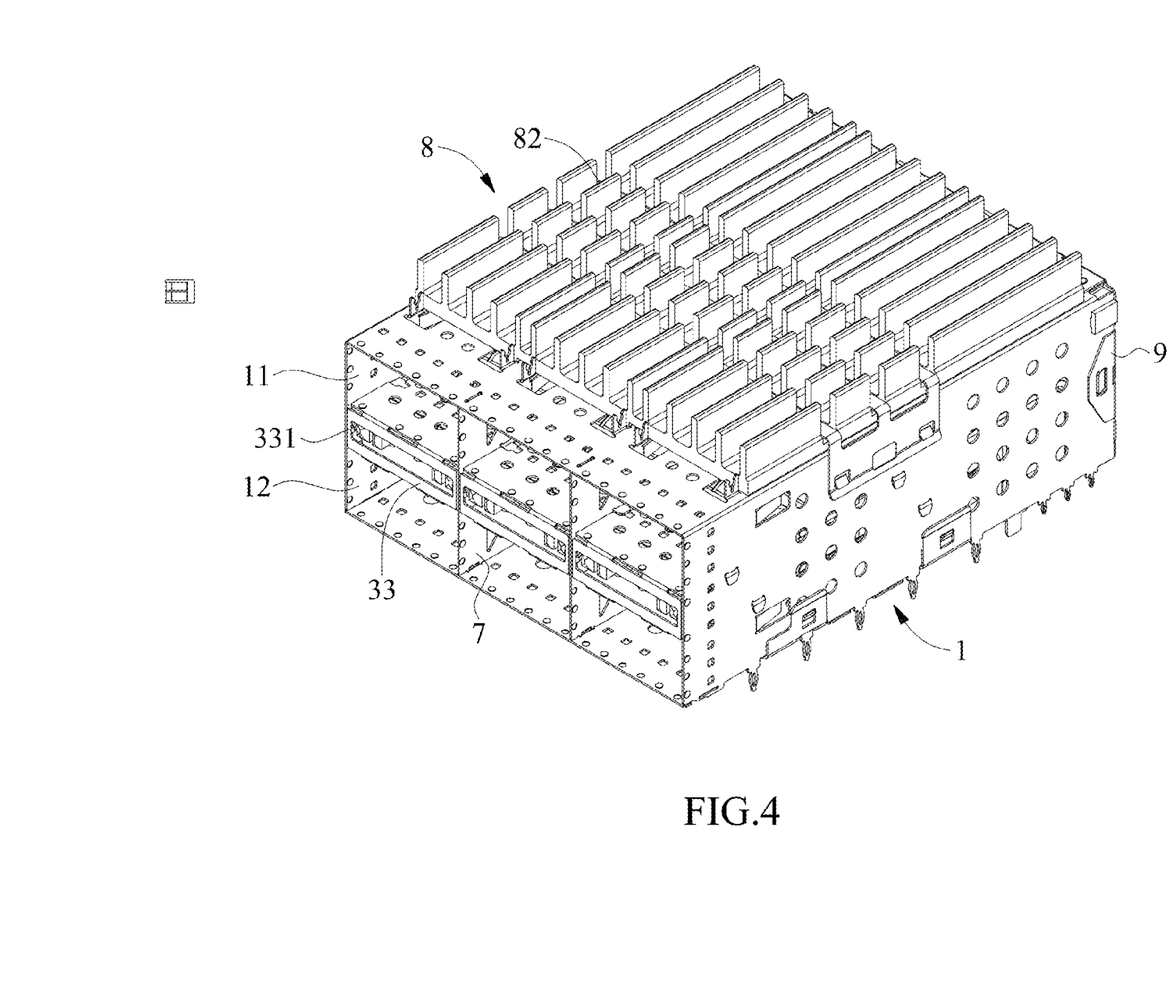
FIG. 4 is a front assembled perspective view of the electrical connector structure according to the first preferred embodiment of the present invention.
Figure 5:
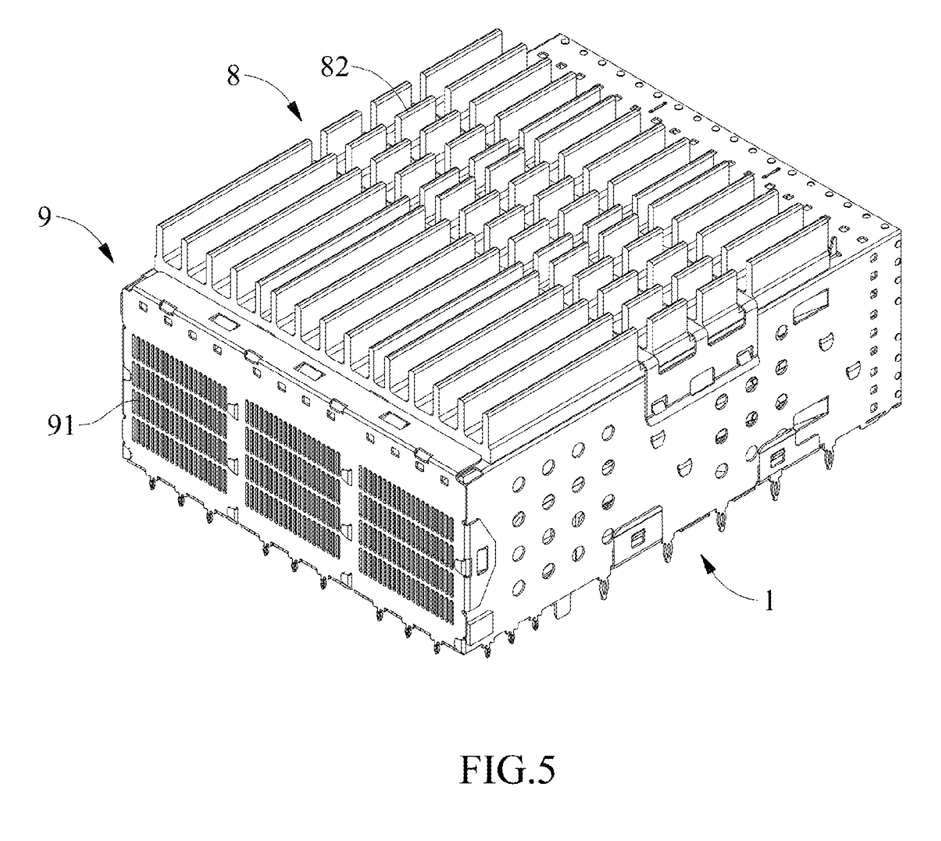
FIG. 5 is a rear assembled perspective view of the electrical connector structure according to the first preferred embodiment of the present invention.

Referring to FIGS. 1 and 6. In both of the first and the second preferred embodiment, when there is a plurality of bases 2, the bases 2 are transversely arranged side by side in the rear inner side of the heat transfer enclosure 1. In this case, the electrical connector structure can further include at least one vertical intermediate heat transfer sheet 7, which is formed with a plurality of left heat transfer spring fingers 71 and a plurality of right heat transfer spring fingers 72. Each vertical intermediate heat transfer sheet 7 simultaneously separates two laterally adjacent upper insertion channels 11, two laterally adjacent horizontal intermediate heat transfer members 3 and two laterally adjacent lower insertion channels 12. The left heat transfer spring fingers 71 are protruded into the upper and lower insertion channels 11, 12 located at a left side of the vertical intermediate heat transfer sheet 7 for contacting with the plug-type devices inserted in the upper and lower insertion channels 11, 12. The right heat transfer spring fingers 72 are protruded into the upper and lower insertion channels 11, 12 located at a right side of the vertical intermediate heat transfer sheet 7 for contacting with the plug-type devices inserted in the upper and lower insertion channels 11, 12. The number of vertical intermediate heat transfer sheets 7 is one less than the number of bases 2. The number and the arrangement of the left heat transfer spring fingers 71 and the right heat transfer spring fingers 72 are not necessarily limited to those shown in FIGS. 1 and 6 but can be changed according to actual need in use. Further, in the case the left and right heat transfer spring fingers 71, 72 are straight in shape, free ends of the left and right heat transfer spring finger 71, 72 should be directed toward the upper and lower insertion slots 21, 22 to avoid hindering the insertion of the plug-type devices into the upper and lower insertion slots 21, 22. On the other hand, in the case the left and right heat transfer spring fingers 71, 72 are curved at front and rear ends, the free ends of the left and right heat transfer spring fingers 71, 72 can be directed toward or away from the upper and lower insertion slots 21, 22. Therefore, when two or more bases 2 are transversely arranged side by side, the vertical intermediate heat transfer sheets 7 can further transfer the heat produced by the plug-type devices inserted in the electrical connector structure to the heat transfer enclosure 1, from where the heat is radiated into surrounding space. Therefore, heat would not concentrate in specific areas of the electrical connector structure to cause a rising temperature at these areas, particularly at the lower insertion channels 12 having the plug-type devices inserted therein.

As can be seen in FIGS. 1 and 6, in both of the first and the second preferred embodiment, the front panel 33 of the horizontal intermediate heat transfer member 3 can have at least one front air vent 331, the base 2 can have at least one second air passage 23 located between the upper and the lower insertion slot 21, 22. The front air vent 331, the first air passage 43 and the second air passage 23 are sequentially communicable with one another. Moreover, both of the first and the second preferred embodiment of the present invention can further include a back panel 9 connected to a rear side of the heat transfer enclosure 1 and a rear side of the at least one base 2. The back panel 9 can have at least one rear air vent 91 communicable with the second air passage 23 on the base 2. Therefore, the electrical connector structure according to the first and the second preferred embodiment of the present invention not only enable conductive and radiative heat transfer into surrounding space, but also utilize the front air vent 331, the first air passage 43, the second air passage 23 and the rear air vent 91 to enable convective heat transfer, which further upgrades the heat transfer efficiency of the electrical connector structure of the present invention.

Also as can be seen in FIGS. 1 and 6, in the electrical connector structure according to the first and the second preferred embodiment of the present invention, the upper and lower heat transfer surfaces 41, 42 of the heat transfer element 4 can be flat surfaces, so that the upper and lower heat transfer sheets 5, 6 or the upper and lower heat transfer blocks 5', 6' can be fitly connected to the upper and lower heat transfer surfaces 41, 42, respectively.

Please refer to FIGS. 1 and 6. The electrical connector structure according to the first and the second preferred embodiment of the present invention can further include at least one heat dissipation member 8, which can have at least one heat radiating fin 82 formed thereon. In this case, the heat transfer enclosure 1 is correspondingly formed with at least one top opening 13. The heat dissipation member 8 is disposed in the top opening 13 with a bottom 81 of the heat dissipation member downward extending into the upper insertion channel 11 for contacting with the plug-type device inserted in the upper insertion channel 11. Therefore, the electrical connector structure according to the first and the second preferred embodiment of the present invention not only enable conductive and radiative heat transfer into surrounding space, but also utilize the heat dissipation member 8 to enable convective heat transfer, which further upgrades the heat transfer efficiency of the electrical connector structure of the present invention.

Figure 9:
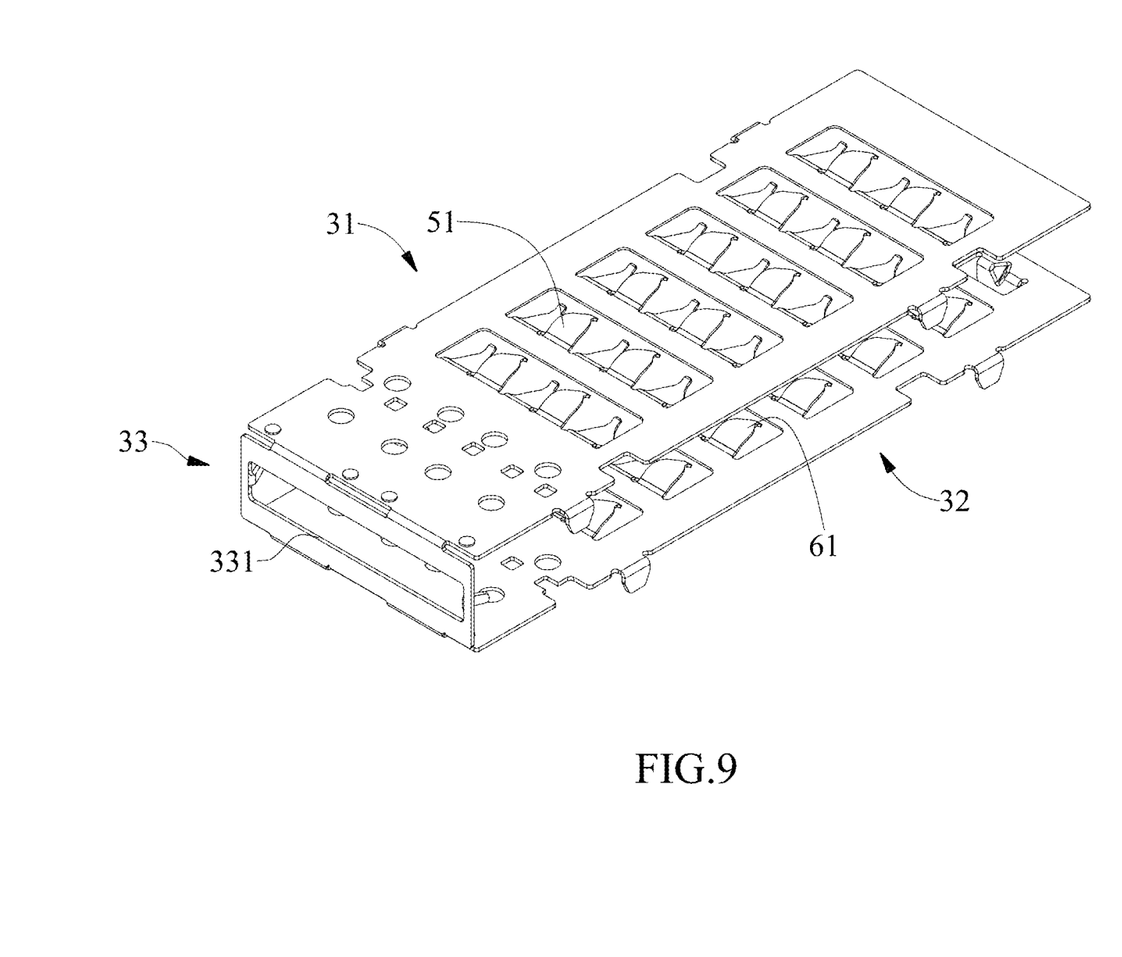
FIG. 9 is a perspective view showing an upper heat transfer sheet, a lower heat transfer sheet and a horizontal intermediate heat transfer member included in the first preferred embodiment of the present invention can be integrally formed.

Please refer to FIG. 9. In the electrical connector structure according to the first preferred embodiment of the present invention, the upper heat transfer sheet 5 can be integrally formed with the upper intermediate sheet 31 of the horizontal intermediate heat transfer member 3 and the lower heat transfer sheet 6 can be integrally formed with the lower intermediate sheet 32 of the horizontal intermediate heat transfer member 3, so as to simplify an overall structure of the electrical connector structure according to the first preferred embodiment of the present invention.

As can be seen in FIG. 9, in the electrical connector structure according to the first preferred embodiment, when the upper heat transfer sheet 5 has a plurality of upper heat transfer spring fingers 51 formed thereon, a part of these upper heat transfer spring fingers 51 can be upward protruded into the upper insertion channel 11 to contact with the plug-type device while others are downward protruded to contact with the upper heat transfer surface 41 of the heat transfer element 4. Similarly, when the lower heat transfer sheet 6 has a plurality of lower heat transfer spring fingers 61 formed thereon, a part of these lower heat transfer spring fingers 61 can be downward protruded into the lower insertion channel 12 to contact with the plug-type device while others are upward protruded to contact with the lower heat transfer surface 42 of the heat transfer element 4. With these arrangements, the upper and lower heat transfer spring fingers 51, 61 can be in exact contact with the heat transfer element 4 and the plug-type devices at the same time to upgrade the heat transfer efficiency of the electrical connector structure.

Figure 10:
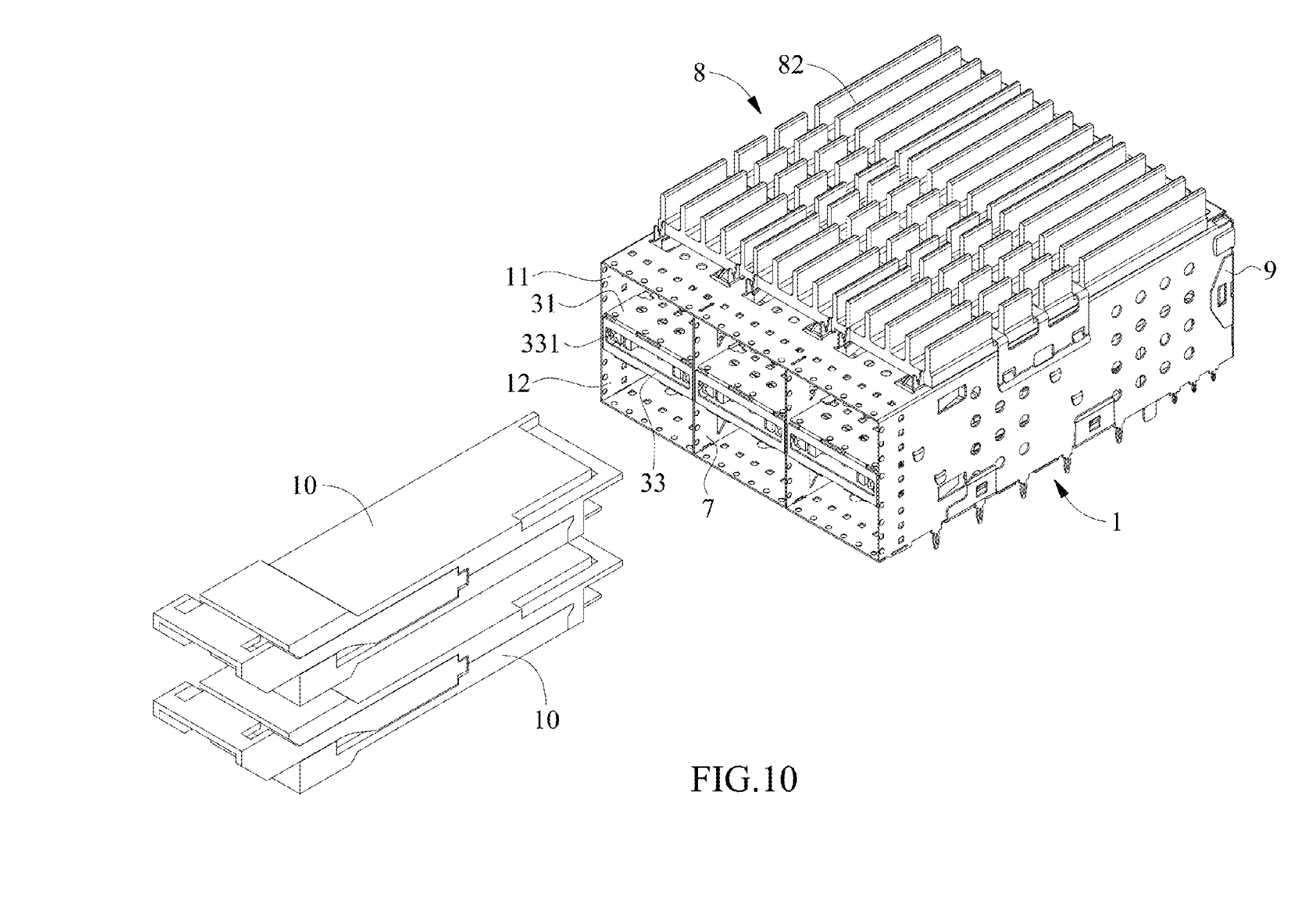
FIG. 10 is a partially exploded perspective view showing the electrical connector structure according to the first and the second preferred embodiment of the present invention can further include plug-type devices.

Please refer to FIG. 10. The electrical connector structure according to the first and the second preferred embodiment of the present invention can further include a plug-type device 10, which is received in the upper insertion channel 11 in contact with the upper heat transfer spring fingers 51 of the upper heat transfer sheet 5 or with the upper heat transfer block 5', or is received in the lower insertion channel 12 in contact with the lower heat transfer spring fingers 61 of the lower heat transfer sheet 6 or with the lower heat transfer block 6'. Therefore, heat produced by the plug-type device 10 can be finally exactly transferred to the heat transfer enclosure 1 and radiated into surrounding space.

As can be seen in FIG. 10, in the case the electrical connector structure according to the first and the second preferred embodiment of the present invention further include the vertical intermediate heat transfer sheet 7, both of the plug-type device 10 received in the upper insertion channel 11 in contact with the upper heat transfer spring fingers 51 of the upper heat transfer sheet 5 or with the upper heat transfer block 5' and the plug-type device 10 received in the lower insertion channel 12 in contact with the lower heat transfer spring fingers 61 of the lower heat transfer sheet 6 or with the lower heat transfer block 6' are also in contact with the left and/or the right heat transfer spring fingers 71, 72 of the vertical intermediate heat transfer sheet 7. Therefore, heat produced by the plug-type devices 10 can be finally exactly transferred to the heat transfer enclosure 1 and radiated into surrounding space.

Figure 11:
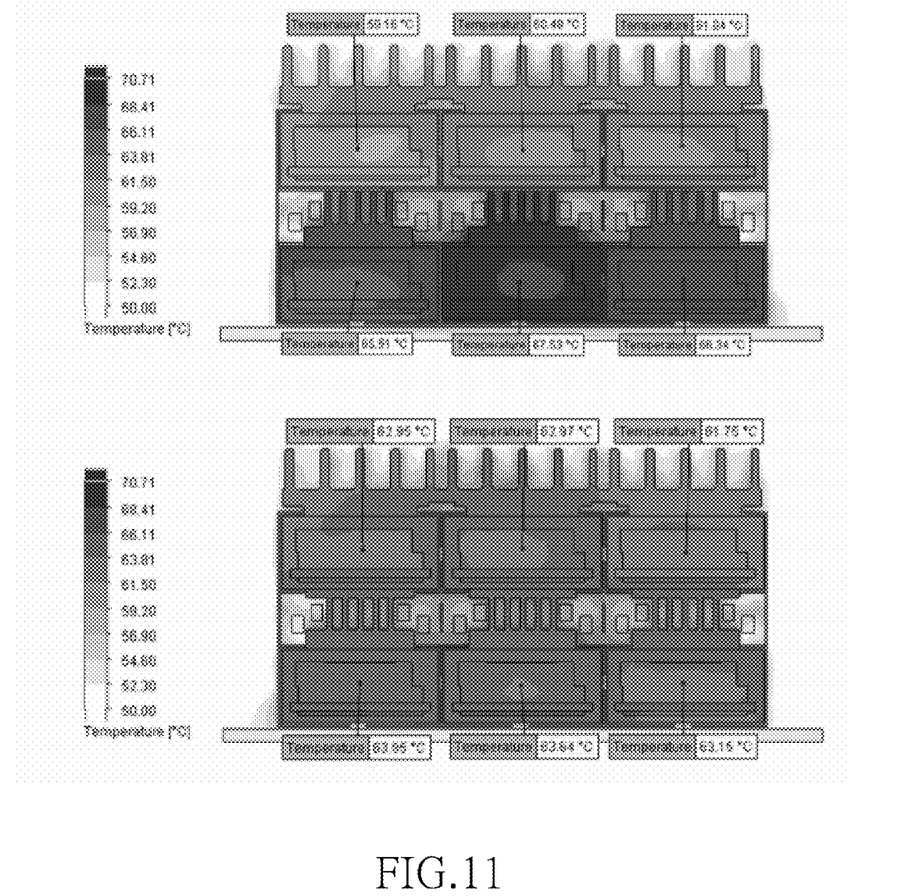
FIG. 11 shows results from temperature simulation for the electrical connector structure according to the first and second preferred embodiments of the present invention.

Please refer to FIG. 11 along with FIGS. 1 and 6. FIG. 11 shows results from temperature simulations for different electrical connectors under the same test environment conditions. An upper part of FIG. 11 shows the measured temperature distribution of a conventional electrical connector structure; and a lower part of FIG. 11 shows the measured temperature distribution of the electrical connector structure according to the first and the second preferred embodiment of the present invention, i.e. the temperature distribution of the electrical connector structure having the upper and lower heat transfer surfaces 41, 42 of the heat transfer element 4 respectively connected to the upper and lower heat transfer sheets 5, 6 or the upper and lower heat transfer blocks 5', 6'. Wherein, the centers of the plug-type devices 10 received in the upper and lower insertion channels 11, 12 are temperature measuring points, and the indicated temperatures are measured at the temperature measuring points. As shown in FIG. 11, in the conventional electrical connector structure, the produced heat can not be easily transferred to the enclosure and tends to concentrate in some specific areas of the electrical connector structure to cause a rising temperature at these areas, particularly at the lower insertion channels having the plug-type devices inserted therein, at where the temperature is 5 to 8 degrees (° C.) higher than other areas. On the other hand, in the electrical connector structure according to the first and the second preferred embodiment of present invention, the produced heat can be easily transferred to the heat transfer enclosure without concentrating in specific areas, so that the electrical connector structure of the present invention has a considerably uniform temperature distribution with only a temperature difference of 1 to 2 degrees (° C.) among different areas.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An electrical connector structure, comprising:
a heat transfer enclosure;
at least one base having an upper insertion slot and a lower insertion slot and being disposed in the heat transfer enclosure;
at least one horizontal intermediate heat transfer member having an upper intermediate sheet, a front panel and a lower intermediate sheet; the front panel being located between and connected to front ends of the upper intermediate sheet and the lower intermediate sheet; the upper intermediate sheet being provided with an upper opening, and the lower intermediate sheet being provided with a lower opening; the horizontal intermediate heat transfer member internally separating the heat transfer enclosure into an upper insertion channel and a lower insertion channel, which are located corresponding to the upper insertion slot and the lower insertion slot, respectively;
at least one heat transfer element having an upper heat transfer surface, a lower heat transfer surface and at least one first air passage; the first air passage being located between the upper and the lower heat transfer surface; and the heat transfer element being disposed in the horizontal intermediate heat transfer member;
at least one upper heat transfer sheet having at least one upper heat transfer spring finger formed thereon; the upper heat transfer sheet being disposed in the upper opening and connected to the upper heat transfer surface; and the upper heat transfer spring finger being protruded into the upper insertion channel; and
at least one lower heat transfer sheet having at least one lower heat transfer spring finger formed thereon; the lower heat transfer sheet being disposed in the lower opening and connected to the lower heat transfer surface; and the lower heat transfer spring finger being protruded into the lower insertion channel.

2. The electrical connector structure as claimed in claim 1, wherein there are at least two bases transversely arranged in the heat transfer enclosure, and the electrical connector structure further comprises at least one vertical intermediate heat transfer sheet, the vertical intermediate heat transfer sheet being formed with a plurality of left heat transfer spring fingers and a plurality of right heat transfer spring fingers, and each vertical intermediate heat transfer sheet separating two laterally adjacent upper insertion channels, two laterally adjacent horizontal intermediate heat transfer members and two laterally adjacent lower insertion channels; the left heat transfer spring fingers being protruded into the upper and lower insertion channels, and the right heat transfer spring fingers being protruded into the upper and lower insertion channels.

3. The electrical connector structure as claimed in claim 1, wherein the front panel of the horizontal intermediate heat transfer member has at least one front air vent and the base has at least one second air passage located between the upper and the lower insertion slot; and the front air vent, the first air passage and the second air passage being sequentially communicable with one another.

4. The electrical connector structure as claimed in claim 1, wherein the upper heat transfer surface of the heat transfer element is a flat surface, the lower heat transfer surface of the heat transfer element is a flat surface.

5. The electrical connector structure as claimed in claim 1, wherein the upper heat transfer sheet is integrally formed with the upper intermediate sheet of the horizontal intermediate heat transfer member, the lower heat transfer sheet is integrally formed with the lower intermediate sheet of the horizontal intermediate heat transfer member.

6. The electrical connector structure as claimed in claim 5, wherein the upper heat transfer sheet has a plurality of upper heat transfer spring fingers formed thereon, and a part of the upper heat transfer spring fingers being protruded into the upper insertion channel while others being protruded to contact with the upper heat transfer surface of the heat transfer element; wherein the lower heat transfer sheet has a plurality of lower heat transfer spring fingers formed thereon, and a part of the lower heat transfer spring fingers being protruded into the lower insertion channel while others being protruded to contact with the lower heat transfer surface of the heat transfer element.

7. The electrical connector structure as claimed in claim 1, further comprising a plug-type device adapted to be inserted into the upper insertion channel or the lower insertion channel, the plug-type device being in contact with the upper heat transfer spring finger of the upper heat transfer sheet or the lower heat transfer spring finger on the lower heat transfer sheet.

8. The electrical connector structure as claimed in claim 2, further comprising a plug-type device adapted to be inserted into the upper insertion channel or the lower insertion channel, the plug-type device being in contact with the upper heat transfer spring finger of the upper heat transfer sheet or the lower heat transfer spring finger of the lower heat transfer sheet, and the plug-type device being in contact with the left or the right heat transfer spring fingers of the vertical intermediate heat transfer sheet.

9. The electrical connector structure as claimed in claim 1, further comprising at least one heat dissipation member; and wherein the heat transfer enclosure is formed with at least one top opening; the heat dissipation member being correspondingly disposed in the top opening with a bottom of the heat dissipation member extending into the upper insertion channel.

10. An electrical connector structure, comprising:
a heat transfer enclosure;
at least one base having an upper insertion slot and a lower insertion slot and being disposed in the heat transfer enclosure;
at least one horizontal intermediate heat transfer member having an upper intermediate sheet, a front panel and a lower intermediate sheet; the front panel being located between and connected to front ends of the upper intermediate sheet and the lower intermediate sheet, the upper intermediate sheet being provided with an upper opening, and the lower intermediate sheet being provided with a lower opening; the horizontal intermediate heat transfer member internally separating the heat transfer enclosure into an upper insertion channel and a lower insertion channel, which are located correspondingly to the upper insertion slot and the lower insertion slot, respectively;
at least one heat transfer element having an upper heat transfer surface, a lower heat transfer surface and at least one first air passage; the first air passage being located between the upper and the lower heat transfer surface; and the heat transfer element being disposed in the horizontal intermediate heat transfer member;
at least one upper heat transfer block being disposed in the upper opening and connected to the upper heat transfer surface; and the upper heat transfer block being protruded into the upper insertion channel; and
at least one lower heat transfer block being disposed in the lower opening and connected to the lower heat transfer surface; and the lower heat transfer block being protruded into the lower insertion channel.

11. The electrical connector structure as claimed in claim 10, wherein there are at least two bases transversely arranged in the heat transfer enclosure, and the electrical connector structure further comprises at least one vertical intermediate heat transfer sheet, the vertical intermediate heat transfer sheet being formed with a plurality of left heat transfer spring fingers and a plurality of right heat transfer spring fingers, and each vertical intermediate heat transfer sheet separating two laterally adjacent upper insertion channels, two laterally adjacent horizontal intermediate heat transfer members and two laterally adjacent lower insertion channels; the left heat transfer spring fingers being protruded into the upper and lower insertion channels, and the right heat transfer spring fingers being protruded into the upper and lower insertion channels.

12. The electrical connector structure as claimed in claim 10, wherein the front panel of the horizontal intermediate heat transfer member has at least one front air vent and the base has at least one second air passage located between the upper and the lower insertion slot; and the front air vent, the first air passage and the second air passage being sequentially communicable with one another.

13. The electrical connector structure as claimed in claim 10, wherein the upper heat transfer surface of the heat transfer element is a flat surface, the lower heat transfer surface of the heat transfer element is a flat surface.

14. The electrical connector structure as claimed in claim 10, further comprising a plug-type device adapted to be inserted into the upper insertion channel or the lower insertion channel, the plug-type device being in contact with the upper heat transfer block or the lower heat transfer block.

15. The electrical connector structure as claimed in claim 11, further comprising a plug-type device adapted to be inserted into the upper insertion channel or the lower insertion channel, the plug-type device being in contact with the upper heat transfer block or the lower heat transfer block, and the plug-type device being in contact with the left or the right heat transfer spring fingers of the vertical intermediate heat transfer sheet.

16. The electrical connector structure as claimed in claim 10, further comprising at least one heat dissipation member; and wherein the heat transfer enclosure is formed with at least one top opening; the heat dissipation member being correspondingly disposed in the top opening with a bottom of the heat dissipation member extending into the upper insertion channel.

* * * * *